United States Patent [19]

Garrett et al.

[11] 4,116,896

[45] Sep. 26, 1978

[54] FOUNTAIN COMPOSITIONS FOR USE IN LITHOGRAPHIC PRINTING COMPRISING AQUEOUS SOLUTIONS OF POLYACRYLAMIDE BASED POLYMERS AND BLENDS OF POLYACRYLAMIDE AND POLYACRYLIC ACID WITH AN ORGANIC CHELATING AGENT

[75] Inventors: Walter L. Garrett, Freeland; Ralph E. Friedrich; Ralph G. Czerepinski, both of Midland, all of Mich.

[73] Assignee: The Dow Chemical Company, Midland, Mich.

[21] Appl. No.: 727,825

[22] Filed: Sep. 29, 1976

Related U.S. Application Data

[63] Continuation-in-part of Ser. No. 586,452, Jun. 12, 1975, abandoned.

[51] Int. Cl.[2] .......... C08L 1/28; B41M 3/00; B41N 3/00

[52] U.S. Cl. .......... 260/17 R; 96/48 R; 101/463; 260/29.6 WB; 260/29.6 E; 260/29.6 HN; 260/29.6 M

[58] Field of Search .... 260/17 R, 29.6 WB, 29.6 HN, 260/29.6 M, 29.6 E; 96/48; 101/463

[56] References Cited

U.S. PATENT DOCUMENTS

| | | | |
|---|---|---|---|
| 2,186,945 | 1/1940 | Wood | 101/451 |
| 3,276,360 | 10/1966 | Stimson et al. | 96/33 |
| 3,276,361 | 10/1966 | Abbott | 96/33 |
| 3,284,202 | 11/1966 | Leonard | 96/75 |
| 3,287,128 | 11/1966 | Lugasch | 96/75 |
| 3,374,094 | 3/1968 | Wainer | 96/33 |
| 3,745,028 | 7/1973 | Rauner | 106/2 |

FOREIGN PATENT DOCUMENTS

| | | | |
|---|---|---|---|
| 2,037,940 | 4/1971 | Fed. Rep. of Germany | 101/453 |
| 1,055,711 | 1/1967 | United Kingdom | 101/457 |

OTHER PUBLICATIONS

Offset Printing, Journ., No. 85, p. 17, Feb. 28, 1976.

American Newspaper Publishers Assoc., - "Research Bulletin, " 9/16/74.

Chem. Absts., 80:151208b, "Photosensitive Composition for Lithographic Plates," Sato et al.

Chem. Absts., 73:30677a, "Acrylamide Photosensitive Layers for Printing Plates," Adams et al.

*Primary Examiner*—Edward M. Woodberry

*Attorney, Agent, or Firm*—Burke M. Halldorson; Glenn H. Korfhage

[57] ABSTRACT

Precipitation at relatively high pH levels, e.g. above about 4 or more, in an acidic water/alcohol type fountain composition containing polyvalent metal cations and, as an active polymer component for rendering the non-image areas of a lithographic plate hydrophilic, a polyacrylamide-based polymer having a weight average molecular weight ($\overline{M}_w$) of from about 5,000 to about 1,000,000 and having from about 3 to about 70 percent of the carbonyl sites as carboxyl groups, or a blend of polyacrylamide and polyacrylic acid, or the like, is controlled by providing in the fountain composition an effective amount of an organic chelating agent for polyvalent metal cations which is substantially inert with respect to the active polymer component. The suitable chelating agents are further characterized in that at 25° C, each (A) has a 1:1 stability constant with zinc of at least about $10^{7.5}$; (B) has a solubility of at least about 0.001 moles per liter in the water/alcohol solvent system over the pH range of from about 3 to about 7; and (C) when in a stable complexed form with polyvalent metal cation(s), has a solubility of at least about 0.001 moles per liter in the water/alcohol solvent system over the pH range of from about 3 to about 7. A preferred chelating agent is the pentasodium salt of diethylenetriaminepentaacetic acid.

26 Claims, No Drawings

FOUNTAIN COMPOSITIONS FOR USE IN LITHOGRAPHIC PRINTING COMPRISING AQUEOUS SOLUTIONS OF POLYACRYLAMIDE BASED POLYMERS AND BLENDS OF POLYACRYLAMIDE AND POLYACRYLIC ACID WITH AN ORGANIC CHELATING AGENT

CROSS REFERENCE

This application is a continuation-in-part of prior copending application Ser. No. 586,452, filed June 12, 1975 now abandoned.

BACKGROUND FOR THE DESCRIPTION OF THE INVENTION

Field of the Invention

The invention relates to compositions and methods for dampening lithographic plates during a printing run. More particularly, the invention relates to an improvement whereby detrimental precipitation is controlled in acidic alcohol/water fountain solutions containing polyvalent metal cations and polyacrylamide-based polymers, or the like.

Definition of terms

The term "image" includes (1) both the hydrophobic, oleophilic, ink receptive areas of a lithographic plate produced, for example, on development of a photolithographic plate following exposure to actinic light, and also (2) the latent image produced in the light sensitive coating of such a photolithographic plate after exposure of the plate to actinic light but prior to development.

The term "non-image" refers to hydrophilic, oleophobic, water receptive, ink repelling areas of a lithographic printing plate.

By "image-bearing surface" is meant the entire surface of the lithographic plate exposed to the print receptive surface, e.g., paper, or to the blanket in the printing process. The term includes both the image and non-image areas of the plate as hereinabove defined.

"Scumming" refers to the condition that exists on the printing plate or result in the printed image when the water receptive areas of the printing plate become at least partially ink receptive.

The term "blinding" refers to the condition that exists on the printing plate or results in the printed image when the image areas of the printing plate become at least partially water receptive and are not properly ink receptive, e.g. the condition that is exhibited when hydrophilic material from the fountain solution adheres to the plate image instead of or in addition to the non-image areas. "Toning" or "tinting" refers to emulsification of the ink as globules in water in the non-image areas which results in ink transfer to the print in non-image areas.

The term "chromium-anion providing agent" refers to compounds selected from the group consisting of chromic acid and the alkali metal- and ammonium-chromates and bichromates.

It is very difficult if not virtually impossible to have an aqueous solution of polyacrylamide wherein all of the carbonyl sites are amide moieties. The term "polyacrylamide" therefore refers to a polymer comprised of at least 98 percent

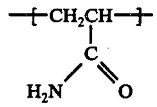

combining units. Included within the meaning of polyacrylamide are polymers containing 98 percent of the above combining units, and up to 2 percent

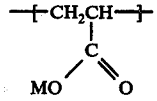

combining units wherein M is a hydrogen, alkali metal, or ammonium ion.

The term "carboxyl groups(s)" refers to the moiety

wherein Z is a hydrogen, alkali metal, or ammonium ion.

The term "alcohol" refers generically to lower alkyl mono- and polyhydric alcohols and glycol ethers having a molecular weight of about 170 or less. Examples include isopropyl alcohol, propylene glycol, glycerine, and diethylene glycol ethyl ether.

By "lower alkyl" is meant having no more than four consecutive carbon atoms.

The terms "active polymer(s)" and "active polymer component(s)" mean in a generic sense any one or more of the members (a) through (e) of the group consisting of:

(a) a polyacrylamide-based polymer wherein from about 3 to about 70 percent of the carbonyl sites are carboxyl groups, and the balance of said sites are amide moieties;

(b) a physical blend comprised of from about 97 to about 30 weight percent polyacrylamide and from about 3 to about 70 percent polyacrylic acid or an alkali metal or ammonium salt thereof;

(c) a physical blend comprised of polyacrylamide, or polyacrylic acid or an alkali metal or ammonium salt thereof, and at least one polyacrylamide-based polymer as described in (a), said polymers being employed in proportions such that of the total carbonyl sites present in the blend, from about 3 to about 70 percent are carboxyl groups and the balance are amide moieties;

(d) a mixture of any two or more of the foregoing;

the weight average molecular weight of each of said polyacrylamide-based polymer, polyacrylamide, and polyacrylic acid or salt thereof being in the range of from about 5000 to about 1,000,000; and (e) a co-mixture of one or more of the foregoing with up to about 30 weight percent hydroxypropyl methylcellulose based on the total weight of the comixture, said hydroxypropyl methylcellulose being of a type which produces a 2 weight percent aqueous solution having a viscosity of from about 1 to about 100 cP when measured according to ASTM Method D 2363-72.

The particular method by which the polyacrylamide-based polymer is prepared is not critical. Included within the definition are polymers formed by copolymerization of acrylamide and acrylic acid, or salts thereof, in proportions and conditions such that of the carbonyl sites in the resulting copolymer, from about 3 to about 70 percent are carboxyl groups. Alternatively, the polyacrylamide-based polymer may be obtained by hydrolysis of polyacrylamide.

The expression "1:1 stability constant" refers to the value of $K_1$ in the expression $K_1 = [ML]/[M][L]$, where $[M]$ represents the molar concentration of a particular polyvalent metal cation, $[L]$ represents the molar concentration of the ligand, and $[ML]$ represents the molar concentration of the chelated complex.

The phase "polyvalent metal cation(s)" as used herein does not include cations of the alkaline earth metals.

"Garret I" is used herein to refer to the collective teachings of the two United States Patent Applications by Walter L. Garrett and Ralph G. Czerepinski, Ser. No. 586,455, entitled "Method of treating Image-Bearing Lithographic Plates" and Ser. No. 586,451, entitled "Compositions for Treating Image-Bearing Lithographic Plates", both filed June 12, 1975, and which are continuations-in-part, respectively, of Ser. Nos. 565,915 and 565,916, both filed Apr. 7, 1975. The aforegoing applications are now abandoned in favor of applications Ser. Nos. 763,262 and 727,320, filed Jan. 27, 1977 and Sept. 27, 1976, respectively.

By an "effective amount" of a chelating agent is meant an amount at least sufficient to stablize an acidic water/alcohol fountain solution of the type described in Garret I containing polyvalent metal cations so that the pH at which precipitation first occurs in such a solution, absent the chelate, is increased by at least about 1 pH unit, or to pH 7, whichever is less.

Description of the Prior Art

Lithographic printing, which is a type of planographic printing, is a well known and established art. In general, the process involves printing from a flat plate or cylinder having substantially no surface relief (hence, the term "planographic"), and depends upon different properties of the image and non-image areas of the surface for printability. In lithography, the image to be reproduced is imparted to the plate by any one of several methods well-known to those skilled in the art in such a way that the non-image areas are rendered hydrophilic while the image areas are hydrophobic, A wide practiced technique employs a photosensitive coating for this purpose. Following exposure of the photosensitive coating to imagewise modulated light, the latent image is developed and a portion of the coating is removed from the plate. Next, the plate is treated with a desensitizing solution to render the plate hydrophilic in the areas from which the photosensitive coating has been removed. During the actual printing process, an aqueous fountain solution is applied to the plate surface. The fountain solution keeps moist all portions of the surface not covered by the hydrophobic image. Furthermore, the fountain solution prevents the plate from scumming. The fountain solution may be formulated to gradually etch the surface of the plate just enough to keep the lines sharp and prevent rapid wear. In a conventional system, the fountain solution is applied to the plate by one or more rollers. At least one ink roller coated with an oil-based printing ink then contacts the entire surface of the plate but deposits the lithographic ink only on the image area since the hydrophollic non-image areas repel the ink. Hence, for each impression made during a run, the lithographic plate is first dampened with the aqueous fountain solution and then inked with a lithographic ink. Alternatively, the fountain solution and at least a portion of the oil-based ink are applied to the plate simultaneously with a first roller. In this latter system, other rollers, usually smaller in diameter than the first, may contact the plate subsequently to distribute the ink more evenly. Finally, the ink image is transferred directly to a paper sheet or other receptive surface to be printed, or to an offset blanket of rubber or synthetic material which in turn transfers the print to the final copy surface.

Gum arabic has long been used in acidic aqueous fountain solutions, sometimes in combination with an etchant, to keep the non-image areas hydrophilic during the press run. The disadvantages of gum arabic are well recognized in the trade and a suitable substitute has long been sought. As a natural product it is subject to considerable variation in quality, and it is also prone to contain foreign matter of various kinds so that it must first be purified. The fountain solutions of gum arabic employed during printing to maintain the non-printing areas hydrophilic tend to emulsify the ink. Excessive emulsification weakens the resolution of the printing, causes scumming of the plate, and stripping of the ink from the ink rollers.

Fountain solutions containing as a gum arabic substitute or extender, an active polymer component as hereinbefore defined are dislcosed in Garret I, the teachings of which are expressly incorporated herein.

Garret I disclosed four types of fountain solutions, grouped according to the pH of the solvent system: acidic aqueous, alkaline aqueous, acidic water/alcohol, and alkaline water/alcohol. Each of the four types was comprised, by weight, of at least about 97 percent solvent—comprised in turned of at least about 75 volume percent water—and from about 0.001 to about 0.5 percent, perferably from about 0.0025 to about 0.1 percent active polymer. Insufficient active polymer is taught to result in inadequate protection of the plate during long press runs, while an excess can result in an inordinate build-up of a glaze on the rollers. The present invention is an improvement on the acidic water/alcohol type fountain solution disclosed therein.

It is known in the art that it is frequently desirable to include an alcohol in the fountain solution, particularly when printing on high quality coated stock, for example, when using a Dahlgren type dampening system. One advantage of an alcohol is that it changes the wetting angle so that the fountain solution can be carried from the fountain reservoir to the plate surface on rollers of metal, rubber or the like, having no water absorbent wrapping, such as cloth or paper. In the acidic water/alcohol fountain solutions of Garrett I, the fountain solution solvent comprises (a) at least about 75 volume percent water and (b) an alcohol, as hereinabove defined, in an amount up to 25 volume percent of the solvent, Since the particular active polymer employed may not be readily soluble in some of the alcohols, Garrett I also teach that in some instances, depending on the nature and concentration of the active polymer component and the particular alcohol employed, the water:alcohol ratio must be greater, i.e., more water, than 75:25 lest precipitation of the active polymer component occur. An advantage of the acidic water/alcohol fountain solutions of Garrett I over gum arabic water/alcohol fountain solutions is that a significantly lower proportion of alcohol is generally required to achieve a desired performance than in comparable fountain solutions based on gum arabic. Moreover, less Garrett I fountain solution is required to maintain the proper ink-water balance than when corresponding solutions of gum arabic are employed, which means faster press speeds are possible since less moisture is transferred to the surface being printed. The proper balance can readily be determined by those skilled in the art since an insufficient supply of fountain solution will provide inadequate moisture to the plate and scumming occurs, while an excess results in carryback of the fountain solution on the ink rollers which leads to uneven ink distribution.

In Garrett I, it is also taught that the fountain solution may contain a metal nitrate in an amount up to about 0.25 weight percent of the solution on an anhydrous basis. A preferred range for the amount of metal nitrate is from about 0.02 to about 0.15 weight percent, and the most preferred range is from about 0.04 to about 0.01 weight percent. The metal nitrates taught to be suitable are those nitrates, the corresponding hydroxide compound of which, e.g., $Mg(OH)_2$, has a solubility product in water at 25° C of from about $10^{-5}$ to about $10-35$, and preferably about $10^{-10}$ to about $10^{-20}$. Included by way of example were the nitrates of magnesium, calcium, cadmium, beryllium, aluminum, tin, zironium, nickel, manganese, iron ($Fe^{+2}$ only), chromium, copper, and lead. Preferably, it was taught that the metal has a standard reduction potential negative with respect to hydrogen, with magnesium and zinc being the most preferred metal nitrates.

The fountain solutions of Garrett I provides a substantial and unexpected advance over the fountain solutions employed prior thereto. However, an annoying problem has been encountered where the acidic water/alcohol fountain solution of Garrett I contains poylvalent metal cations, as defined herein. Such polyvalent metal cations may be deliberately provided in the system initially, for example, as zinc nitrate. Minute amounts of polyvalent metal cations may also accumulate in the fountain solution during the press run from external sources, e.g. carryback from the printed surface via the plate and the fountain roller(s).

When such polyvalent metal cations are present in the acidic water/alcohol fountain solution of Garrett I, precipitation occurs at relatively neutral pH levels. While the pH at which detrimental precipitation occurs varies somewhat depending on the nature and concentration of each of the polyvalent metal cation, the active polymer component, and the alcohol, precipitation is observed in certain fountain solutions if the pH is raised above about 4.

The precipitation can be avoided by maintaining a sufficiently low pH. From a practical standpoint, however, once the press run has begun, press operators simply are not in the habit of maintaining a close watch on the pH of the fountain solution. Typically, a fountain solution is provided in a reservoir having a capacity of approximately 15 gallons (55-60 liters). During the press run, the fountain solution is continuously circulated through conduits between the reservoir and a trough within which a fountain roller rotates, thereby up a film of the solution for transfer to the plate. As the fountain solution is consumed and the reservoir partially empties, a new supply is periodically added to the reservoir. As a run proceeds, the pH of the fountain solution in the system increases very gradually. Thus, absent careful monitoring of the pH, it was heretofore frequently found that a precipitate would form sometime during the press run, in one instance, for example, after about 60,000 impressions. Since minor amounts of precipitate do not appear to impair the quality of the impression produced, the pressman often does not realize a problem exists until the conduits of the fountain system become plugged with the precipitate at which time the printed image is detrimentally affected simply because an insufficient quantity of fountain solution is supplied to the plate. Once the fountain system conduits become plugged, of course, the press must be stopped for maintenance.

Thus, it would be extremely advantageous to be able to increase by at least about 1 pH unit, or to a pH of 7, whichever is less, the pH at which precipitation first occurs in any particular acidic water/alcohol fountain solution of the type described in Garrett I containing polyvalent metal cations, thereby reducing the need for careful monitoring of the pH of the fountain solution during the press run.

SUMMARY OF THE INVENTION

The foregoing and other objectives which will become apparent are achieved by the present invention which comprises the improvement, in an acidic water/alcohol fountain solution of the type described in Garrett I containing polyvalent metal cations, of an effective amount of an organic chelating agent for polyvalent metal cations, which agent is substantially inert with respect to the active polymer component. The chelating agent is further characterized in that at 25° C, it has a 1:1 stability constant with zinc of at least about $10^{7.5}$, and a solubility in the water/alcohol solvent system of at least about 0.001 moles per liter over the pH range of from about 3 to about 7. Finally, when the chelating agent is in a stable complexed form with one or more polyvalent metal ions, the stable complex must have a solubility in the water/alcohol solution at the above mentioned temperature and pH range of at least about 0.001 moles per liter. The invention also encompasses the method of dampening a lithographic plate during printing comprising applying a dampening amount of the improved solution to the plate.

FURTHER DESCRIPTION OF THE INVENTION

A wide range of known chelating agents, including compatible mixtures thereof, can be employed herein, provided they meet the criteria set forth in the "Summary of the Invention", supra. While one requirement is that the chelant have a 1:1 stability constant with zinc of at least about $10^{7.5}$, it should be pointed out that the fountain solution need not necessarily contain zinc; rather, the reference to zinc is a benchmark for defining the strength of the chelating agent.

Most compounds corresponding to the following formula exhibit the properties hereinabove specified, and those that do are suitable for use herein:

$$A(CH_2)_k\overset{\overset{O}{\|}}{C}OX,$$

wherein

*k* is 1 or 2,

X is hydrogen, alkali metal, ammonium, or half alkaline earth metal, and

A is selected from the group consisting of

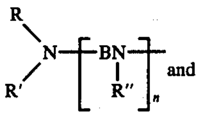 and R'''—S—, wherein

*n* is 0, 1, 2, 3, or 4,

B is an alkylene radical containing 1, 2, 3, or 4 chain carbon atoms, i.e., separating the adjacent nitrogen atoms, including substituted derivatives thereof such as 1,2-cyclohexane, and the like.

R, R', and each R'' are each independently -H, $—(CH_2)_rCH_3$, or R''', and R''' is $—CH_2CH_2OH$, $—(CH_2)_mSH$,

, or 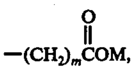, wherein

*r* is hydrogen, alkali metal, ammonium, or half alkaline earth metal, and

*m* is 1 or 2.

The phrase "half alkaline earth metal" refers to an alkaline earth metal ion shared with another carboxyl group within the molecule, such as in the calcium chelate of disodium ethylenediaminetetraacetic acid. Those skilled in the art will recognize that in the presence of polyvalent metal cations, as defined herein, the alkaline earth metal cation is readily displaced in the complex by the polyvalent metal cation.

Examples of specific compounds which are suitable for use herein, each of which is included within the foregoing formula, are: mercaptosuccinic acid; mercaptoethyl iminodiacetic acid; ethylenediaminetetraacetic acid (EDTA), disodium dihydrogen EDTA, tetrasodium salt of EDTA, tri- and tetrammonium salts of EDTA, and the like; iminodiacetic acid and its salts; N-(2-hydroxyethyl)diethylenetriaminetetraacetic acid and its salts; propylenediaminetetraacetic acid and its salts; nitrilotriacetic acid (NTA) and its salts; N-(2-hydroxyethyl)iminodiacetic acid (HEIDA) and its salts; N'-(2-hydroxyethyl)ethylenediamine-N,N,N'-triacetic acid (HEDTA) and its salts; 1,2-diaminocyclohexane-N,N,N',N'-tetraacetic acid and its salts; 1,3-diamino-2-propanoltetraacetic acid and its salts; propylene-1,2-diaminetetraacetic acid and its salts; and diethylenetriaminepentaacetic acid (DTPA) and its salts.

Of the foregoing, the ethylenepolyamine polycarboxylic acids and their alkali metal and ammonium salts are preferred, since they have generally been found capable of preventing precipitation substantially entirely up to a pH of 7 or more when employed in approximately equimolar quantities based on the moles of polyvalent metal cation present. Highly preferred are DTPA and the alkali metal ammonium salts thereof, which have been found particularly effective even in molar amounts less than half that required when most other chelating aents are employed. Most preferred are the sodium salts of DTPA; they are readily soluble in the acidic water/alcohol system and are readily available commercially in the form of the pentasodium salt.

Without unduly limiting the functional scope of the invention, it has generally been found that for most chelating agents employed herein, a molar amount of the chelating agent approximately equal to the moles of polyvalent metal ions present is an ample amount. For a few of the chelating agents, lesser amounts are required. For example, with diethylenetriaminepentaacetic acid and its salts, a minimum effective amount is from about 10 to about 25 percent of an equimolar amount, while from about 25 to about 50 percent of an equimolar amount is usually sufficient to virtually eliminate precipitation below about pH 7. As the relative proportion of alcohol increases, a somewhat greater proportion of a given chelating agent is required, since the active polymer component is not readily soluble in the concentrated alcohols.

As those skilled in the art will recognize, the chelating agent should not be employed in amounts greater than the mutual solubility of the chelating agent and the complex in the fountain solution. An excess of chelating agent in solution over the minimum effective amount does not appear to be detrimental, so that the operative upper limit on the amount of chelating agent which could be employed, assuming suicient solubility of the chelating agent, is about 2.5–3 weight percent of the solution. (Arithmetically, use of greater amounts of chelant would mean the solution would contain insufficient solvent or active polymer.) Moreover, use of large excesses of a chelating agent in base form may raise the pH above 7. In actual practice, however, there is no practical reason for employing such a large excess, although a slight excess may be employed to provide sufficient chelate for polyvalent metal cations which may subsequently enter the fountain solution during the course of the press run.

In addition to the solvent, the active polymer component, the metal nitrate and the chelating agent, the improved fountain solutions of the present invention may also contain other components employed in the fountain solutions of Garrett I, namely: up to about 0.05 weight percent phosphoric acid, preferably from about 0.004 to about 0.03 percent, and most preferably about 0.008 to about 0.018 weight percent; and up to about 0.02 weight percent a chromium-anion providing agent calculated on an anhydrous basis, preferably from about 0.01 to about 0.02 percent. Ammonium bichromate is the preferred chromium-anion providing agent.

In the preferred improved fountain solutions of the present invention, as in Garrett I, each of the polyacrylamide-based polymers, the polyacrylamide, and the polyacrylic acid or salt thereof, has a weight average molecular weight of from about 10,000 to about 500,000, and most preferably from about 25,000–300,000. Also, of the total carbonyl sites in the active polymer component, preferably from about 5 to about 50 percent, and most preferably about 5-25 percent are carboxyl groups.

The method of the present invention is preferably practiced using ball grained, brush grained, or anodized aluminum plates. The invention can also be practiced, however, using copperized aluminum plates or trimetal chromium/copper/aluminum plates, as well as offset master plates of steel, aluminum, or those having zinc oxide/resin binder or titanium dioxide/resin binder surfaces.

EXAMPLES, COMPARISON RUNS, AND SIMULATED RUN

The practice of the invention is further illustrated by the examples which follow. In Tables I through VI, the abbreviations "Ex." and "C.R." represent Example and Comparison Run, respectively.

A series of laboratory experiments was conducted by combining various stock solutions in various proportions to prepare acidic water/alcohol fountain solutions of the type described by Garrett I. Otherwise comparable solutions containing various quantities of a chelating agent were also prepared. Each solution was then neutralized with sodium hydroxide to determine the pH at the permanent cloud point of the solution. The concentration of the sodium hydroxide employed was 1N until the endpoint was nearly reached after which point the titration was completed with 0.1N sodium hydroxide.

The stock solutions employed were the following:

Solution A — 90 grams of zinc nitrate hexahydrate and 8 ml of 85 weight percent phosphoric acid, diluted with water to 1 liter.

Solution B — an 8 weight percent aqueous solution of partially hydrolyzed polyacrylamide, wherein about 10 percent of the carbonyl sites were carboxyl groups, the polymer having a weight average molecular weight of about 250,000. The solution was acidified to a pH of about 4.5 with sulfuric acid.

Solution B' — a 24 weight percent aqueous solution of a copolymer of equal parts acrylic acid and acrylamide, the copolymer having a weight average molecular weight of about 25,000. The solution was acidified to a pH of about 3.8.

Solution C — a 40.2 weight percent aqueous solution of the pentasodium salt of diethylenetriaminepentaacetic acid.

Solution D — a solution prepared by admixing 3 parts by volume water and 1 part by volume of 91 weight percent isopropanol. The solution had a specific gravity at ambient temperature of about 0.95.

Series I: Examples 1–3 and Comparison Runs 1–3

A series of solutions was prepared containing 160 parts per million (ppm) zinc ion and 0.033 weight percent active polymer component by adding Solutions A, B, and C in the amounts shown in grams in Table I to 100 ml (95 grams) of Solution D. (For convenience, the approximate equivalent quantity of each of Solutions A, B, and C in fluid ounces which would be added to 1 gallon of Solution D to prepare comparable solutions is shown in parentheses.) The designation "clear" indicates that no precipitate was observed as the pH of the solution was raised above pH 7. The results tabulated in Table I show that the chelating agent was of no significant benefit when employed in an amount equal to about 10 percent of that theoretically required to chelate all the zinc present, based on one mole of chelating agent per mole of zinc, but was totally effective in maintaining the solution free from a precipitate up to a pH above 7 when employed at about 25 percent of the amount theoretically required.

TABLE I

| Approximate Percent of Theoretical Amount of Chelating Agent | C.R. 1 0 | C.R. 2 5 | C.R. 3 C.R. 3 10 | Ex. 1 25 | Ex. 2 33 | Ex. 3 50 |
|---|---|---|---|---|---|---|
| Soln. A, grams | 0.813 | 0.813 | 0.813 | 0.813 | 0.813 | 0.813 |
| (Fl. Oz./Gallon) | (0.996) | (0.996) | (0.996) | (0.996) | (0.996) | (0.996) |
| Soln. B, grams | 0.401 | 0.401 | 0.401 | 0.401 | 0.401 | 0.401 |
| (Fl. Oz./Gallon) | (0.498) | (0.498) | (0.498) | (0.498) | (0.498) | (0.498) |
| Soln. C, grams | — | 0.015 | 0.029 | 0.073 | 0.098 | 0.147 |
| (Fl. Oz./Gallon) | (—) | (0.015) | (0.029) | (0.072) | (0.096) | (0.145) |
| Total Weight of Fountain Solution | 96.214 | 96.229 | 96.243 | 96.287 | 96.312 | 96.361 |
| Wt. % Active Polymer Component | 0.033 | 0.033 | 0.033 | 0.033 | 0.033 | 0.033 |
| Wt. % $ZnNO_3$ | 0.047 | 0.047 | 0.047 | 0.047 | 0.047 | 0.047 |
| $[Zn^{++}]$, ppm. | 160 | 160 | 160 | 160 | 160 | 160 |
| Moles $Zn^{++}$ per $10^6$ parts Fountain | 2.446 | 2.446 | 2.446 | 2.445 | 2.444 | 2.443 |
| Moles Chelating Agent per $10^6$ parts Fountain | — | 0.125 | 0.241 | 0.597 | 0.796 | 1.219 |
| Initial pH | 4.2 | 4.3 | 4.35 | 4.68 | 5 | 6 |
| pH at Cloud Point | 4.6 | 4.7 | 4.85 | Clear | Clear | Clear |

Series II: Examples 4–6 and Comparison Runs 4–6

Table II shows the results of a series of runs carried out as in Series I, except that by doubling the quantities of Solutions A and B employed, the concentrations of zinc and of the active polymer component were approximately doubled. Once again, it can be seen that when the pentasodium salt of DTPA was employed at 25 percent of that theoretically required to chelate the zinc, precipitation was prevented to a pH above 7.

TABLE II

| Approximate Percent of Theoretical Amount of Chelating Agent | C.R. 4 0 | C.R. 5 5 | C. R. 6 10 | Ex. 4 25 | Ex. 5 33 | Ex. 6 50 |
|---|---|---|---|---|---|---|
| Soln. A, grams | 1.626 | 1.626 | 1.626 | 1.626 | 1.626 | 1.626 |
| (Fl. Oz./Gallon) | (1.992) | (1.992) | (1.992) | (1.992) | (1.992) | (1.992) |
| Soln. B, grams | 0.802 | 0.802 | 0.802 | 0.802 | 0.802 | 0.802 |
| (Fl. Oz./Gallon) | (0.997) | (0.997) | (0.997) | (0.997) | (0.997) | (0.997) |
| Soln. C, grams | — | 0.030 | 0.058 | 0.146 | 0.196 | 0.294 |
| (Fl. Oz./Gallon) | (—) | (0.030) | (0.057) | (0.144) | (0.193) | (0.289) |
| Total Weight of Fountain Solution | 97.428 | 97.478 | 97.486 | 97.574 | 97.624 | 97.722 |
| Wt. % Active Polymer Component | 0.066 | 0.066 | 0.066 | 0.066 | 0.066 | 0.066 |
| Wt. % $ZnNO_3$ | 0.094 | 0.094 | 0.094 | 0.094 | 0.094 | 0.094 |
| $[Zn^{++}]$, ppm. | 316 | 316 | 316 | 316 | 315 | 315 |
| Moles $Zn^{++}$ per $10^6$ parts Fountain | 4.832 | 4.829 | 4.829 | 4.825 | 4.822 | 4.817 |
| Moles Chelating Agent per $10^6$ parts Fountain | — | 0.246 | 0.475 | 1.196 | 1.604 | 2.371 |

TABLE II-continued

| Approximate Percent of Theoretical Amount of Chelating Agent | C.R. 4 0 | C.R. 5 5 | C. R. 6 10 | Ex. 4 25 | Ex. 5 33 | Ex. 6 50 |
|---|---|---|---|---|---|---|
| Initial pH | 3.5 | 3.68 | 3.85 | 4.47 | 4.85 | 5.22 |
| pH at Cloud Point | 4.25 | 4.35 | 4.45 | Clear | Clear | Clear |

Series III: Examples 7-10 and Comparison Runs 7 and 8

In this Series, the concentration of zinc was slightly greater than in Series II, but the concentration of the polymer was about six times greater. As can be seen in Table III, a significant beneficial effect was obtained when the chelating agent was employed at a level of about 10 percent of the theoretical amount required, and when employed at the 25 percent level, precipitation was totally avoided up to pH levels in excess of 7.

TABLE III

| Approximate Percent of Theoretical Amount of Chelating Agent | C.R. 7 0 | C.R. 8 5 | Ex. 7 10 | Ex. 8 25 | Ex. 9 33 | Ex. 10 50 |
|---|---|---|---|---|---|---|
| Soln. A, grams | 1.886 | 1.887 | 1.887 | 1.889 | 1.891 | 1.893 |
| (Fl. Oz./Gallon) | (2.310) | (2.312) | (2.312) | (2.314) | (2.316) | (2.319) |
| Soln. B, grams | 5.099 | 5.101 | 5.103 | 5.109 | 5.112 | 5.118 |
| (Fl. Oz./Gallon) | (6.338) | (6.340) | (6.343) | (6.350) | (6.354) | (6.362) |
| Soln. C, grams | — | 0.034 | 0.069 | 0.172 | 0.230 | 0.345 |
| (Fl. Oz./Gallon) | (—) | (0.033) | (0.038) | (0.169) | (0.226) | (0.340) |
| Total Weight of Fountain Solution | 101.985 | 102.022 | 102.059 | 102.170 | 102.233 | 102.356 |
| Wt. % Active Polymer Component | 0.400 | 0.400 | 0.400 | 0.400 | 0.400 | 0.400 |
| Wt. % $ZnNO_3$ | 0.104 | 0.104 | 0.104 | 0.104 | 0.104 | 0.104 |
| [$Zn^{++}$], ppm. | 350 | 350 | 350 | 350 | 350 | 350 |
| Moles $Zn^{++}$ per $10^6$ parts Fountain | 5.354 | 5.355 | 5.353 | 5.353 | 5.355 | 5.354 |
| Moles Chelating Agent per $10^6$ parts Fountain | — | 0.266 | 0.540 | 1.345 | 1.798 | 2.693 |
| Initial pH | 4.5 | 4.65 | 4.7 | 4.8 | 5.08 | 5.28 |
| pH at Cloud Point | 4.78 | 5.5 | 6.2 | Clear | Clear | Clear |

Series IV: Examples 11-13 and Comparison Runs 9-11

Series IV, summarized in Table IV, is similar to Series III except that Solution B' was used as the source of the active polymer component. Thus, the weight average molecular weight of the active polymer component was about 25,000 instead of about 250,000. In this run, the chelating agent was not significantly effective at 10 percent of the amount theoretically required, but precipitation was totally avoided when the sodium DTPA was employed at 25 percent of the theoretically required amount.

TABLE IV

| Approximate Percent of Theoretical Amount of Chelating Agent | C.R. 9 0 | C.R. 10 5 | C.R. 11 10 | Ex. 11 25 | Ex. 12 33 | Ex. 13 50 |
|---|---|---|---|---|---|---|
| Soln. A, grams | 1.886 | 1.887 | 1.887 | 1.889 | 1.891 | 1.893 |
| (Fl. Oz./Gallon) | (2.310) | (2.312) | (2.312) | (2.314) | (2.316) | (2.319) |
| Soln. B', grams | 1.7 | 1.7 | 1.7 | 1.7 | 1.7 | 1.7 |
| (Fl. Oz./Gallon) | (2.1) | (2.1) | (2.1) | (2.1) | (2.1) | (2.1) |
| Soln. C, grams | — | 0.034 | 0.069 | 0.172 | 0.230 | 0.345 |
| (Fl. Oz./Gallon) | (—) | (0.033) | (0.038) | (0.169) | (0.226) | (0.340) |
| Total Weight of Fountain Solution | 98.586 | 98.621 | 98.656 | 98.761 | 98.821 | 98.938 |
| Wt. % Active Polymer Component | 0.414 | 0.414 | 0.414 | 0.413 | 0.413 | 0.412 |
| Wt. % $ZnNO_3$ | 0.107 | 0.108 | 0.108 | 0.108 | 0.108 | 0.108 |
| [$Zn,^{++}$], ppm. | 362 | 362 | 362 | 362 | 362 | 362 |
| Moles Zn ++ per $10^6$ parts Fountain | 5.539 | 5.540 | 5.538 | 5.538 | 5.540 | 5.539 |
| Moles Chelating Agent per $10^6$ parts Fountain | — | 0.275 | 0.559 | 1.392 | 1.860 | 2.79 |
| Initial pH | 3.72 | 3.78 | 3.88 | 4.02 | 4.12 | 4.32 |
| pH at Clound Point | 3.9 | 3.98 | 4.08 | Clear | Clear | Clear |

Series V: Examples 14-16 and Comparison Runs 12-14

In Table V, similar results are shown where the active polymer component and the zinc nitrate each comprised about 0.1 weight percent of the solution.

TABLE V

| Approximate Percent of Theoretical Amount of Chelating Agent | C.R. 12 0 | C.R. 13 5 | C.R. 14 10 | Ex. 14 25 | Ex. 15 33 | Ex. 16 50 |
|---|---|---|---|---|---|---|
| Soln. A, grams | 1.813 | 1.814 | 1.814 | 1.816 | 1.817 | 1.819 |
| (Fl. Oz./Gallon | (2.221) | (2.222) | (2.222) | (2.225) | (2.226) | (2.228) |
| Soln. B, grams | 1.225 | 1.226 | 1.226 | 1.228 | 1.228 | 1.230 |
| (Fl. Oz./Gallon) | (1.523) | (1.524) | (1.524) | (1.526) | (1.526) | (1.529) |
| Soln. C, grams | 0.0 | 0.033 | 0.066 | 0.164 | 0.219 | 0.329 |
| (Fl. Oz./Gallon) | (—) | (0.032) | (0.065) | (0.161) | (0.216) | (0.324) |

TABLE V-continued

| Approximate Percent of Theoretical Amount of Chelating Agent | C.R. 12 0 | C.R. 13 5 | C.R. 14 10 | Ex. 14 25 | Ex. 15 33 | Ex. 16 50 |
|---|---|---|---|---|---|---|
| Total Weight of Fountain Solution | 98.038 | 98.073 | 98.106 | 98.208 | 98.264 | 98.378 |
| Wt. % Active Polymer Component | 0.100 | 0.100 | 0.100 | 0.100 | 0.100 | 0.100 |
| Wt. % $ZnNO_3$ | 0.103 | 0.104 | 0.104 | 0.104 | 0.104 | 0.104 |
| $[Zn^{++}]$, ppm. | 350 | 350 | 350 | 350 | 350 | 350 |
| Moles $Zn^{++}$ per $10^6$parts Fountain | 5.354 | 5.355 | 5.353 | 5.354 | 5.354 | 5.353 |
| Moles Chelating Agent per $10^6$ parts Fountain | — | 0.269 | 0.538 | 1.334 | 1.781 | 2.672 |
| Initial pH | 3.6 | 3.75 | 3.97 | 4.32 | 4.6 | 5.12 |
| pH at Cloud Point | 4.2 | 4.3 | 4.45 | Clear | Clear | Clear |

Series VI: Examples 17–18 and Comparison Runs 15–18

In this Series, the active polymer component, the zinc nitrate, and the phosphoric acid were each employed in amounts greater than are normally regarded as preferred. As shown in Table VI, the chelating agent was effective to significantly increase the pH at which precipitation occurred when employed in an amount about one-third that theoretically required. When the chelating agent was employed at about 50 percent of that theoretically required, the solution remained clear to a pH above 7.

TABLE VI

| Approximate Percent of Theoretical Amount of Chelating Agent | C.R.15 0 | C.R.16 5 | C.R.17 10 | C.R.18 25 | Ex. 17 33 | Ex. 18 50 |
|---|---|---|---|---|---|---|
| Soln. A, grams | 3.626 | 3.628 | 3.628 | 3.632 | 3.634 | 3.638 |
| (Fl. Oz./Gallon) | (4.44) | (4.44) | (4.44) | (4.45) | (4.45) | (4.46) |
| Soln. B, grams | 2.450 | 2.452 | 2.452 | 2.456 | 2.456 | 2.460 |
| (Fl. Oz./Gallon) | (3.05) | (3.05) | (3.05) | (3.05) | (3.05) | (3.06) |
| Soln. C, grams | — | 0.066 | 0.132 | 0.328 | 0.438 | 0.658 |
| (Fl. Oz./Gallon) | (—) | (0.065) | (0.130) | (0.323) | (0.431) | (0.648) |
| Total Weight of Fountain Solution | 101.076 | 101.146 | 101.212 | 101.416 | 101.528 | 101.756 |
| Wt. % Active Polymer Component | 0.194 | 0.194 | 0.194 | 0.194 | 0.194 | 0.193 |
| Wt. % $ZnNO_3$ | 0.202 | 0.202 | 0.201 | 0.201 | 0.201 | 0.201 |
| $[Zn^{++}]$, ppm. | 679 | 679 | 678 | 678 | 677 | 677 |
| Moles $Zn^{++}$ per $10^6$ parts Fountain | 10.386 | 10.385 | 10.378 | 10.369 | 10.363 | 10.351 |
| Moles Chelating Agent per $10^6$ parts Fountain | 0 | .54 | 1.042 | 2.584 | 3.447 | 5.167 |
| Initial pH | 3.3 | 3.52 | 3.6 | 4.0 | 4.32 | 4.82 |
| pH at Cloud Point | 4.1 | 4.24 | 4.3 | 4.85 | 5.8 | Clear |

Series VII: Comparison Run 19

A series of solutions was prepared having zinc nitrate and active polymer component concentrations comparable to those described in Series I, except that the chelating agent employed was mercaptoacetic acid (also known as thioglycolic acid). The chelating agent was found substantially ineffective in raising the pH at which a permanent cloud point was observed, even when employed at 200 percent of that theoretically required to chelate all the zinc.

Series VIII: Example 19 and Comparison Run 20

In a system comparable to that of Example 1, mercaptosuccinic acid was ineffective at 25 percent of the amount theoretically required to chelate all the zinc, but prevented precipitation to a pH well in excess of 7 when employed at a concentration of 50 percent of the theoretical amount required.

Series IX: Simulated Runs

A solution was prepared from 2400 ml. of tap water, 950 ml. of 91 weight percent isopropanol, 300 ml. of Solution A and 150 ml. of Solution B. Such a mixture contains the active polymer component in an amount of about 0.34 weight percent; zinc nitrate, about 0.47 weight percent; and phosphoric acid, about 0.095 weight percent. Because the amounts of phosphoric acid and zinc nitrate are so high, the solution is not suitable for use as a fountain solution. However, aliquots of the solution do provide suitable means for comparing the relative effectiveness of various chelating agents in raising the pH at which incipient precipitation occurs. The results are shown in Table VII. Oxydiacetic acid (also known as diglycolic acid) and N,N-bis(hydroxyethyl)glycine are included as comparisons and are not regarded as suitable for use herein. In the table, a blank (—) indicates no run was made at that concentration.

TABLE VII

| | pH at Permanent Cloud Point Using Various Chelating Agents | | | | |
|---|---|---|---|---|---|
| Moles of Chelating Agent per mole of $Zn^{++}$ | 0 | .48 | .6 | .8 | 1.2 |
| Oxydiacetic acid | 3.8 | — | — | — | 4.3 |
| N,N-bis(hydrosyethyl) glycine | 3.8 | — | — | — | 4.1 |
| Hydroxyethyliminodiacetic acid | 3.8 | — | 4.1 | 4.3 | 6.4 |
| Nitrilotriacetic acid* | 3.8 | — | 4.3 | 4.4 | Clear |
| Hydroxyethylethylenediaminetriacetic acid* | 3.8 | — | 4.2 | 4.5 | Clear |
| Ethylenediaminetetraacetic acid* | 3.8 | — | 4.3 | 4.6 | Clear |
| Diethylenetriaminepentaacetic acid* | 3.8 | 4.8 | 5.6 | 6.6 | Clear |

*Dissolved as the sodium salt.

From the table, it can be seen that DTPA is substantially more effective than other chelating agents in raising the pH at which a precipitate forms. The reason for the especially surprising behavior of DTPA compared to, for example, EDTA and HEDTA, is not understood. While DTPA is capable of coordinating with two metal cations, the same is also true of EDTA and HEDTA. Furthermore, the pH dependent conditional stability constants of HEDTA, EDTA, and DTPA are not sufficiently different from each other over the pH range of 3 to 7 to account for the results observed.

EXAMPLE 21

A fountain concentrate was formulated comprising the following by weight:

- 5.38 parts zinc nitrate hexahydrate;
- 0.82 part 85 weight percent phosphoric acid;
- 25.59 parts an aqueous solution containing 8 weight percent partially hydrolyzed (about 10 percent carbonyl sites as carboxyl groups) polycrylamide having a weight average molecular weight of about 25,000;
- 5.67 parts a 40.2 weight percent aqueous solution of the pentasodium salt of DTPA; and
- 62.54 parts water (in addition to that provided by the above components).

Three fountain solutions were prepared by admixing, respectively, 1.5 fluid ounces (44.4 ml), 2 fluid ounces (59.1 ml), and 3 fluid ounces (88.7 ml) of the above concentrate with 1 gallon (3.785 liters) of a mixture of 3 parts by volume water and 1 part by volume 91 weight percent isopropylalcohol. The initial pH of the fountain solutions was 4.7, 4.5, and 4.17 respectively. To each of the three fountains was added aqueous sodium hydroxide. Each fountain solution remained clear up to and beyond pH 9.

EXAMPLE 22

A fountain solution comparable to that prepared in Example 21 by admixing 2 fluid ounces of the concentrate with the water/isopropyl alcohol was employed in Harris-Cottrell LTZ printing press for several different printing runs over a period in excess of a week, including one continuous run of about 70,000 impressions. Impressions of superb quality were consistently obtained. The fountain system hardware was examined at the conclusion of the period and was found to be completely free from plugging or precipitation of any sort.

What is claimed is:

1. In a fountain solution for dampening a lithographic printing plate during a press run, of the type containing (1) polyvalent metal cations, (2) at least about 97 weight percent solvent, said solvent containing at least one lower alkyl mono- or polyhydric alcohol or glycol ether having a molecular weight of about 170 or less, and at least about 75 volume percent water, and (3) from about 0.001 to about 0.5 weight percent avtive polymer component, the active polymer component being selected from the group consisting of (a) a polyacrylamide-based polymer wherein from about 3 to about 70 percent of the carbonyl sites are carboxyl groups, and the balance of said sites are amide moieties, (b) a physical blend comprised of from about 97 to about 30 weight percent polyacrylamide and from about 3 to about 70 percent polyacrylic acid or an alkali metal or ammonium salt thereof, (c) a physical blend comprised of polyacrylamide, or polyacrylic acid or an alkali metal or ammonium salt thereof, and at least one polyacrylamide-based polymer as described in (a), said polymers being employed in proportions such that of the total carbonyl sites present in the blend, from about 3 to about 70 percent are carboxyl groups and the balance are amide moieties, (d) a mixture of any two or more of the foregoing, (a)- (c)

the weight average molecular weight of each of said polyacrylamide-based polymer, polyacrylamide, and polyacrylic acid or salt thereof being in the range of from about 5000 to about 1,000,000, and (e) a co-mixture of one or more of the foregoing (a)-(d) with up to about 30 weight percent hydroxypropyl methylcellulose based on the total weight of the comixture, said hydroxypropyl methylcellulose being of a type which produces a 2 weight percent aqueous solution having a viscosity of from about 1 to about 100 cP when measured according to ASTM Method D 2363-72, the solution being further characterized by a pH of less than about 7, the improvement which comprises: providing in the composition, an effective amount of at least one organic chelating agent for the polyvalent metal cations, said chelating agent being substantially inert with respect to the active polymer component and further characterized (A) by a 1:1 stability constant with zinc of at least about $10^{7.5}$ at 25° C, (B) by a solubility in the water/alcohol solvent system at 25° C and at a pH of from about 3 to about 7, of at least 0.001 mole per liter, and (C) by its property of forming with the polyvalent metal cations, a complex having a solubility in the water/alcohol solvent system at 25° C and at a pH of from about 3 to about 7 of at least 0.001 mole per liter.

2. The improved composition of claim 1 wherein the chelating agent is represented by the formula

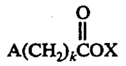

wherein $k$ is 1 or 2,

X is hydrogen, alkali metal, ammonium, or half alkaline earth metal, and

A is selected from the grou consisting of

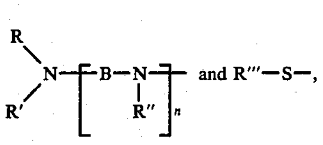

wherein n is 0, 1, 2, 3, or 4,

B is an alkylene radical containing 1 through 4 chain carbon atoms separating the nitrogen atoms, and substituted derivatives thereof, and R, R′, and R″ are each independently H, $-(CH_2)_rCH_3$, or R‴, and R‴, is $-CH_2CH_2OH$, $-(CH_2)_mSH$,

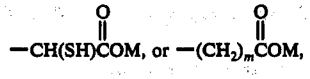

wherein $r$ is 0, 1, 2, or 3,

M is hydrogen, alkali metal, ammonium or half alkaline earth metal, and $m$ is 1 or 2.

3. The improved composition of claim 2 wherein the chelating agent is selected from the group consisting of ethylene polyamine polycarboxylic acids and the alkali metal and ammonium salts thereof.

4. The improved composition of claim 3 containing sufficient chelating agent to maintain the solution substantially free from precipitation up to a pH of 7.

5. The improved composition of claim 3 wherein the chelating agent is selected from the group consisting of diethylenetriaminepentaacetic acid and the alkali metal and ammonium salts thereof.

6. The improved composition of claim 5 containing the chelating agent in an amount of from the minimum effective amount up to about 0.25 mole of chelate per mole of polyvalent metal cations.

7. The improved composition of claim 5 containing the chelating agent in an amount of from the minimum amount necessary to maintain the solution substantially free from precipitation up to a pH of 7, up to 0.5 mole of chelating agent per mole of polyvalent metal cations.

8. The improved composition of claim 3 wherein the active polymer component comprises from about 0.0025 to about 0.1 weight percent of the composition; wherein the weight average molecular weight of each of the polyacrylamide-based polymer, the polyacrylamide, and the polyacrylic acid or salt thereof comprising the active polymer component is from about 25,000 to about 300,000; wherein of the carbonyl sites in the active polymer component, from about 5 to about 25 percent are carboxyl groups; and wherein the composition contains at least one of (a) metal nitrate in an amount up to 0.25 weight percent of the solution, the metal nitrate being selected from those metal nitrates, the corresponding hydroxide compound of which has a solubility product in water at 25° C of about $10^{-5}$ to $10^{-35}$, and mixtures thereof, (b) phosphoric acid in an amount up to about 0.05 weight percent of the solution, and (c) a chromium-anion providing agent in an amount up to 0.02 weight percent of the solution.

9. The improved composition of claim 8 containing from about 0.02 to about 0.15 weight percent zinc nitrate.

10. The improved composition of claim 9 containing from about 0.04 to about 0.1 weight percent zinc nitrate.

11. The improved composition of claim 9 wherein the chelating agent is a sodium salt of diethylenetriaminepentaacetic acid.

12. The improved composition of claim 11 containing the chelating agent in an amount of from the minimum effective amount up to about 0.25 mole of chelating agent per mole of polyvalent metal cations.

13. The improved composition of claim 11 containing the chelating agent in an amount of from the minimum amount necessary to maintain the solution substantially free from precipitation up to pH of 7, up to 0.5 mole of chelating agent per mole of polyvalent metal cations.

14. In a method for dampening a lithographic printing plate during a printing run, wherein there is applied to the plate a dampening amount of an acidic water/alcohol fountain solution containing (1) polyvalent metal cations, (2) at least about 97 weight percent solvent, said solvent containing at least one lower alkyl mono- or polyhydric alcohol or glycol ether having a molecular weight of about 170 or less, and at least about 75 volume percent water, and (3) from about 0.001 to about 0.5 weight percent active polymer component, the active polymer component being selected from the group consisting of (a) a polyacrylamide-based polymer wherein from about 3 to about 70 percent of the carbonyl sites are carboxyl groups, and the balance of said sites are amide moieties, (b) a physical blend comprised of from about 97 to about 30 weight percent polyacrylamide and from about 3 to about 70 percent polyacrylic acid or an alkali metal or ammonium salt thereof, (c) a physical blend comprised of polyacrylamide, or polyacrylic acid or an alkali metal or ammonium salt thereof, and at least one polyacrylamide-based polymer as described in (a), said polymers being employed in proportions such that of the total carbonyl sites present in the blend, from about 3 to about 70 percent are carboxyl groups and the balance are amide moieties, (d) a mixture of any two or more of the foregoing (a)–(d), the weight average molecular weight of each of said polyacrylamide-based polymer, polyacrylamide, and polyacrylic acid or salt thereof being in the range of from about 5000 to about 1,000,000, and (e) a co-mixture of one or more of the foregoing (a)–(d) with up to about 30 weight percent hydroxypropyl methylcellulose based on the total weight of the comixture, said hydroxypropyl methylcellulose being of a type which produces a 2 weight percent aqueous solution having a viscosity of from about 1 to about 100 cP when measured according to ASTM Method D 2363-72, the solution being further characterized by a pH of less than about 7, the improvement which comprises: providing in the composition, an effective amount of at least one organic chelating agent for the polyvalent metal cations, said chelating agent being substantially inert with respect to the active polymer component and further characterized (A) by a 1:1 stability constant with zinc of at least about $10^{7.5}$ at 25° C, (B) by a solubility in the water/alcohol solvent system at 25° C and at a pH of from about 3 to about 7 of at least 0.001 mole per liter, and (C) by its property of forming with the polyvalent metal cations, a complex having a solubility in the water/alcohol solvent system at 25° C and at a pH of from about 3 to about 7 of at least 0.001 mole per liter.

15. The improved method of claim 14 wherein the chelating agent is represented by the formula

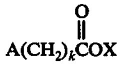

wherein $k$ is 1 or 2,

X is hydrogen, alkali metal, ammonium, or half alkaline earth metal, and

A is selected from the group consisting of

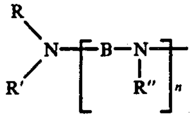 and $R'''-S-$, wherein $n$ is 0, 1, 2, 3, or 4,

B is an alkylene radical containing 1 through 4 chain carbon atoms separating the nitrogen atoms, and substituted derivatives thereof, and Rm R', and R'' are each independently H, $-(CH_2)_rCH_3$, or R''' and R''' is $-CH_2CH_2OH$, $-(CH_2)_mSH$, $$-CH(SH)\overset{\overset{O}{\|}}{C}OM, \text{ or } -(CH_2)_m\overset{\overset{O}{\|}}{C}OM,$$

wherein $r$ is 0, 1, 2, or 3, $M$ is hydrogen, alkali metal, ammonium, or half alkaline earth metal, and $m$ is 1 or 2.

16. The improved method of claim 15 wherein the chelating agent is selected from the group consisting of ethylene polyamine polycarboxylic acids and the alkali metal and ammonium salts thereof.

17. The improved method of claim 16 wherein sufficient chelating agent is provided in the solution to maintain the solution substantially free from precipitation up to a pH of 7.

18. The improved method of claim 16 wherein the chelating agent is selected from the group consisting of diethylenetriaminepentaacetic acid and the alkali metal and ammonium salts thereof.

19. The improved method of claim 18 wherein the chelating agent is employed in an amount of from the minimum effective amount up to about 0.25 mole of chelating agent per mole of polyvalent metal cations.

20. The improved method of claim 18 wherein the chelating agent is employed in an amount of from the minimum amount necessary to maintain the solution substantially free from precipitation up to a pH of 7, up to 0.5 mole of chelating agent per mole of polyvalent metal cations.

21. The improved method of claim 16 wherein the active polymer component comprises from about 0.0025 to about 0.1 weight percent of the composition; wherein the weight active molecular weight of each of the polyacrylamide-based polymer, the polyacrylamide, and the polyacrylic acid or salt thereof comprising the active polymer component is from about 25,000 to about 300,000; wherein of the carbonyl sites in the active polymer component, from about 5 to about 25 percent are carboxyl groups; and wherein the composition contains at least one of (a) a metal nitrate in an amount up to 0.25 weight percent of the solution, the metal nitrate being selected from those metal nitrates, the corresponding hydroxide compound of which has a solubility product in water at 25° C of about $10^{-5}$ to $10^{-35}$, and mixtures thereof, (b) phosphoric acid in an amount up to about 0.05 weight percent of the solution, and (c) a chromium-anion providing agent in an amount up to 0.02 weight percent of the solution.

22. The improved method of claim 21 wherein there is employed in the solution from about 0.02 to about 0.15 weight percent zinc nitrate.

23. The improved method of claim 22 wherein there is employed in the solution from about 0.04 to about 0.1 weight percent zinc nitrate.

24. The improved method of claim 22 wherein the chelating agent is a sodium salt of diethylenetriaminepentaacetic acid.

25. The improved method of claim 24 wherein the chelating agent is employed in an amount of from the minimum effective amount up to about 0.25 mole of chelating agent per mole of polyvalent metal cations.

26. The improved method of claim 24 wherein the chelating agent is employed in an amount of from the minimum amount necessary to maintain the solution substantially free from precipitation up to a pH of 7, up to 0.5 mole of chelating agent per mole of polyvalent metal cations.

* * * * *

UNITED STATES PATENT AND TRADEMARK OFFICE

CERTIFICATE OF CORRECTION

PATENT NO. : 4,116,896

DATED : September 26, 1978

INVENTOR(S) : Walter L. Garrett et al.

It is certified that error appears in the above-identified patent and that said Letters Patent are hereby corrected as shown below:

Col. 1, line 45, change the word "result" to --results--.

Col. 1, line 55, start a new paragraph with the word "Toning".

Col. 3, line 14, delete "phase" and insert --phrase--.

Col. 3, lines 16 and 31, change the name "Garret" to --Garrett--.

Col. 3, line 47, delete the comma "," after the word "hydrophobic" and insert a period --.--.

Col. 3, line 48, delete "wide" and insert --widely--.

Col. 3, line 68, delete "hydropholic" and insert --hydrophilic--.

Col. 4, line 29, delete "dislosed" and insert --disclosed--.

UNITED STATES PATENT AND TRADEMARK OFFICE
CERTIFICATE OF CORRECTION

PATENT NO. : 4,116,896

DATED : September 26, 1978

INVENTOR(S) : Garrett et al.

It is certified that error appears in the above-identified patent and that said Letters Patent are hereby corrected as shown below:

Col. 4, lines 29 and 31, delete the name "Garret" and insert --Garrett--.

Col. 4, line 58, delete the comma "," after the word "solvent" and insert a period --.--.

Col. 5, line 19, delete "0.01" and insert --0.1--.

Col. 5, line 23, delete "10-35" and insert --$10^{-35}$--.

Col. 5, line 26, delete "zironium" and insert --zirconium--.

Col. 5, line 32, delete "provides" and insert --provide--.

Col. 5, line 63, add the word --picking-- at the beginning of the line before the word "up".

Col. 6, line 5, delete the word "impression" and insert --impressions--.

UNITED STATES PATENT AND TRADEMARK OFFICE
CERTIFICATE OF CORRECTION

PATENT NO. : 4,116,896

DATED : September 26, 1978

INVENTOR(S) : Garrett et al.

It is certified that error appears in the above-identified patent and that said Letters Patent are hereby corrected as shown below:

Col. 7, line 21, after the word "wherein" insert --r is 0, 1, 2, or 3,--.

Col. 7, line 22, at the beginning of the line delete "r" and insert --M--.

Col. 7, line 59, delete "aents" and insert --agents--.

Col. 8, line 19, delete "suicient" and insert --sufficient--.

Col. 11 and 12, Table IV, last line of first column, delete "Clound" and insert --Cloud--.

Col. 13, Table V, last line of Column 3, delete "4.3" and insert --4.33--.

Col. 15, line 21, delete "polycrylamide" and insert --polyacrylamide--.

Col. 15, line 43, insert the word --a-- at the beginning of the line.

UNITED STATES PATENT AND TRADEMARK OFFICE

CERTIFICATE OF CORRECTION

PATENT NO. : 4,116,896

DATED : September 26, 1978

INVENTOR(S) : Garrett et al.

It is certified that error appears in the above-identified patent and that said Letters Patent are hereby corrected as shown below:

Col. 15, line 58, Claim 1, delete the word "avtive" and insert --active--.

Col. 16, line 53, Claim 2, delete "grou" and insert --group--.

Col. 16, line 67, Claim 2, delete the comma "," after "R''' " (second occurrence)

Col. 17, Claim 8, line 39, insert the word --a-- after "(a)".

Col. 18, Claim 14, line 26, delete "(a)-(d)," and insert --(a)-(c),--

Col. 19, line 12, Claim 15, delete "Rm" and insert --R,--.

Col. 20, line 7, Claim 21, delete the word "active" and insert --average--.

Signed and Sealed this

*Twelfth* Day of *June 1979*

[SEAL]

*Attest:*

RUTH C. MASON
*Attesting Officer*

DONALD W. BANNER
*Commissioner of Patents and Trademarks*